United States Patent
Dawson et al.

(10) Patent No.: US 12,461,267 B2
(45) Date of Patent: Nov. 4, 2025

(54) FRACTURE DETECTION USING DISTRIBUTED OPTICAL FIBER SENSING

(71) Applicant: Silixa Ltd., Elstree (GB)

(72) Inventors: Peter Dawson, Elstree (GB); Veronique Mahue, Elstree (GB); Vu Nguyen, Elstree (GB); Pete Richter, Elstree (GB); Yinghui Wu, Elstree (GB)

(73) Assignee: Silixa Ltd., Elstree (GB)

( * ) Notice: Subject to any disclaimer, the term of this patent is extended or adjusted under 35 U.S.C. 154(b) by 529 days.

(21) Appl. No.: 17/820,894

(22) Filed: Aug. 19, 2022

(65) Prior Publication Data

US 2023/0054654 A1 Feb. 23, 2023

Related U.S. Application Data

(60) Provisional application No. 63/235,181, filed on Aug. 20, 2021.

(51) Int. Cl.
*G01V 1/50* (2006.01)
*E21B 49/00* (2006.01)
*G01V 1/22* (2006.01)
*G01V 1/52* (2006.01)

(52) U.S. Cl.
CPC ............... *G01V 1/50* (2013.01); *E21B 49/00* (2013.01); *G01V 1/226* (2013.01); *G01V 1/52* (2013.01)

(58) Field of Classification Search
CPC . G01V 1/50; G01V 1/226; G01V 1/52; G01V 2210/646; G01V 1/288; G01V 2210/1234; G01V 2210/1429; E21B 49/00; G01H 9/004
See application file for complete search history.

(56) References Cited

U.S. PATENT DOCUMENTS

| | | | |
|---|---|---|---|
| 2012/0111560 A1* | 5/2012 | Hill | E21B 43/26 166/308.1 |
| 2020/0072995 A1 | 3/2020 | Milne et al. | |
| 2020/0309982 A1 | 10/2020 | Jin et al. | |

FOREIGN PATENT DOCUMENTS

| | | |
|---|---|---|
| WO | WO-2010136810 A2 | 12/2010 |
| WO | WO-2016142695 A1 | 9/2016 |

* cited by examiner

*Primary Examiner* — An H Do
(74) *Attorney, Agent, or Firm* — Honigman LLP; Matthew H. Szalach (57) ABSTRACT

The present disclosure provides a method of processing data obtained from distributed optical fiber sensors to detect acoustic energy generated by a poroelastic effect of fractures in a structure, such as a rock formation. The sensing fiber of an optical fiber distributed sensing system may be deployed in the vicinity of the region where fracturing is occurring, for example, along a well that is offset from a treatment well undergoing hydraulic fracturing. The DAS data obtained from along the sensing fiber is processed to measure changes in the low-frequency strain caused by the poroelastic effects in the rock as the fractures open and close. This measured strain rate data is iteratively processed at each instant time to identify fracture opening features (characterised as compression-tension-compression) that are correlated with fracture closing features (characterised as tension-compression-tension) as a function of depth, to thereby identify and locate fracture hits in the vicinity of the sensing fiber.

20 Claims, 5 Drawing Sheets

FRACTURE DETECTION USING DISTRIBUTED OPTICAL FIBER SENSING

CROSS REFERENCE TO RELATED APPLICATIONS

This application claims priority under 35 U.S.C. § 119(e) to U.S. Provisional Application 63/235,181, filed Aug. 20, 2021. The disclosure of this prior application is considered part of the disclosure of this application and is hereby incorporated by reference in its entirety.

TECHNICAL FIELD

Embodiments of the present disclosure relate to distributed optical fiber sensing, and in particular, to a method of processing data obtained from distributed optical fiber sensors for monitoring fractures in a structure.

BACKGROUND TO THE INVENTION AND PRIOR ART

Optical fiber based distributed sensor systems are finding many applications, in particular in the oil and gas industry for flow monitoring and seismic detection, and in the security industry for area or perimeter security monitoring, or monitoring along a long line such as a pipeline or railway line. The present applicant, Silixa Ltd, of Elstree, London, markets two optical fiber distributed sensing systems, the Silixa® iDAS™ system, which is a very sensitive optical fiber distributed acoustic sensor, and the Silixa® Ultima™ system, which is a distributed optical fiber based temperature sensor. Further details of the iDAS™ system are available at the priority date at http://www.silixa.com/technology/idas/, and further details of the Ultima™ system are available at the priority date at https://silixa.com/technology/ultima-dts/. In addition, the present applicant's earlier International patent application WO 2010/136810 gives further technical details of the operation of its distributed acoustic sensor system, the entire contents of which necessary for understanding the present invention being incorporated herein by reference.

One use of Silixa's optical fiber DAS technology has been to monitor hydraulic fracturing in long horizontal or vertical wells. In unconventional shale oil and gas plays, distributed fiber optic sensing technologies can be utilized to understand interactions that occur between wells when one or more of the wells are hydraulically stimulated. Such interactions are also called fracture hits, wherein the well that is being fracked communicates with one or more of the nearby wells. Measurements of strain from an offset well close to the treatment well can help determine the fracture geometries and its dynamics. By understanding these interactions, engineers can optimize well completions as well as determine the appropriate completions for a given well spacing. In this respect, identification of the location and duration of the fracture hit allows geophysicists and petroleum engineers to better understand the geophysical and geomechanical processes taking place in these dynamic stimulations at various scales.

Existing methods of identifying the location of fracture hits at off-set wells mostly include obtaining strain rate data measured by a distributed fiber optic sensor and manually identifying fracture hits from the compression-tension-compression features in the strain rate data that are associated with fracture opening. However, the accuracy of this method is very dependent on the experience of the engineer and can only be performed after a stage of the fracking have been completed. Other methods include calculating the maximum strain rate, the summation of strain rates, and the summation of strain-rate amplitudes during a period of cumulative time (normally corresponding to one stage of hydraulic fracking), however, this method can again yield inaccurate results and can only be performed after a stage of fracking is completed. A further method described in US 2020/0309982 inputs strain rate data into a trained neural network after a stage of fracking is complete, wherein the neural network also calculates the maximum strain rate, the summation of strain rates, and the summation of strain-rate amplitudes during a period of cumulative time to determine the probability that facture hit is at a given location.

SUMMARY OF THE INVENTION

Embodiments of the present disclosure solve the above noted problems by providing a method of processing data obtained from distributed optical fiber sensors to detect acoustic energy generated by poroelastic fractures in a structure, such as a rock formation. The sensing fiber of an optical fiber distributed sensing system may be deployed in the vicinity of the region where fracturing is occurring, for example, along a well that is offset from a treatment well undergoing hydraulic fracturing. The DAS data obtained from along the sensing fiber is processed to measure changes in the low-frequency strain caused by the poroelastic effects in the rock as the fractures open and close. This measured strain rate data is iteratively processed at each instant time, for example, every 1, 20 seconds, to identify fracture opening features (characterised as compression-tension-compression) that are correlated with fracture closing features (characterised as tension-compression-tension) as a function of depth, to thereby identify and locate fracture hits in the vicinity of the sensing fiber. That is to say, if a fracture opening and a fracture closing are detected at the same depth, this indicates the presence and location of a fraction hit (i.e. an interaction between the fracture and another structure in the vicinity of the sensing fiber). In doing so, fracture hits can be detected and located in substantially real-time with a high degree of accuracy and confidence. Furthermore, the duration of the opening and closing features can be determined to provide an accurate measurement of the duration of the fracture hit, which may be indicative of the distance that the fracture is travelling.

A first aspect of the present disclosure provides a method of detecting acoustic energy generated by a poroelastic effect of fractures in an area or structure to be monitored, the method comprising receiving distributed acoustic sensor (DAS) data from an optical fiber distributed acoustic sensor having a sensing fiber deployed in a vicinity of the area or structure, processing the DAS data to obtain a set of strain rate data, iteratively processing the strain rate data to detect a set of first features and a set of second features, wherein detection of a first feature and a second feature at a same sensing region along the sensing fiber is indicative of a fracture hit at a first location.

The first feature may comprise a compression-tension-compression (C-T-C) feature in the strain rate data, whilst the second feature may comprise a tension-compression-tension (T-C-T) feature in the strain rate data. As such, by iteratively processing the strain rate data to simultaneously look for C-T-C and T-C-T features detected at the same point along the fiber, the location of fracture hits can be accurately determined based on a correlation between that sensing region and a position in the area or structure being monitored. For example, in down-hole applications, the sensing region will be at a certain depth along the well. Furthermore, by iteratively processing the strain rate data as it is received, the location and duration of the fracture hits can be determined in real-time.

In some cases, detecting a compression-tension-compression feature in the strain rate data may comprise detecting a first portion of negative strain data below a first predetermined threshold at a first sensing position along the sensing fiber, detecting a first portion of positive strain rate data above a second predetermined threshold at a second sensing position along the sensing fiber, and detecting a second portion of negative strain data below the first predetermined threshold at a third sensing position along the sensing fiber, wherein the first predetermined threshold is lower than the second predetermined threshold, and wherein the second sensing position is between the first and third sensing position.

Similarly, detecting a tension-compression-tension feature in the strain rate data may comprise detecting a first portion of positive strain data above a first predetermined threshold at a first sensing position along the sensing fiber, detecting a first portion of negative strain rate data below a second predetermined threshold at a second sensing position along the sensing fiber, and detecting a second portion of positive strain data above the first predetermined threshold at a third sensing position along the sensing fiber, wherein the first predetermined threshold is higher than the second predetermined threshold, and wherein the second sensing position is between the first and third sensing position.

It will be appreciated however that the thresholds applied for detecting a compression-tension-compression feature may be different to those applied for detecting a tension-compression-tension feature.

The first feature may be indicative of a fracture opening and the second feature may be indicative of a fracture closing.

The first location may be determined based on a position of the sensing region along the sensing fiber.

The method may further comprise detecting a plurality fracture hits are detected at the first location during a first period of time.

The method may also comprise computing a first sum of a number or intensity of the first feature detected during the first period of time, and computing a second sum of a number or intensity of the second feature detected during the first period of time. That is to say, if the first and second features are detected at a particular depth a plurality of times during a period of time, the number of times that the features are detected may be summed, or the intensity of each respective feature detected during that period of time may be summed. In doing so, regions where there is a strong correlation between the first features detected and the second features detected can be identified and confidently determined as a location of a fracture hit.

The sensing fiber may be deployed along a first well in the vicinity of a second well undergoing hydraulic fracturing operations. In such cases, the first feature may be indicative of a rock fracture opening around or in the second well during a first hydraulic fracturing operation, whilst the second feature may be indicative of a rock fracture closing around or in the second well after the first hydraulic fracturing operation has ceased. The detection of the first feature and the second feature at the same sensing region along the sensing fiber may therefore be indicative of a fracture hit in the first well from the second well.

The method may further comprise correlating the fracture hit at the first location with at least one perforation along the second well. This enables an engineer to determine the effectiveness of the hydraulic fracturing operation and adjust parameters of the operation accordingly.

The strain rate data may be iteratively processed in substantially real-time. That is to say, the strain rate data is processed substantially as DAS data is received and strain rate data extracted therefrom. As such, fracture hits can be located on the fly. In applications such as hydraulic fracture operations, this means that fracture hits can be identified during a fracking operation, such that an engineer is able to use that information to adjust parameters of the operation on the fly.

The strain rate data may be processed in intervals of about 1 second up to about 20 seconds. Preferably, the strain rate data may be processed every 10 seconds. It will however be appreciated that the processing may be repeated over any suitable time interval depending on the setting in which it is being used and the frequency at which DAS data is received.

A further aspect of the present disclosure provides a system for detecting acoustic energy generated by a poroelastic effect of fractures in an area or structure to be monitored, the system comprising an optical fiber distributed acoustic sensor having a sensing fiber deployed in a vicinity of the area or structure, and processing means operatively configured to (i) process distributed acoustic sensor (DAS) data received from the optical fiber distributed acoustic sensor to obtain a set of strain rate data, and (ii) iteratively process the strain rate data to detect a set of first features and a set of second features, wherein detection of a first feature and a second feature at a same sensing region along the sensing fiber is indicative of a fracture hit at a first location.

In some cases, the sensing fiber may be deployed along a first well in the vicinity of a second well undergoing hydraulic fracturing operations.

The sensing fiber may be one of: a wireline, a permanently installed optical fiber cable or a temporarily installed optical fiber cable.

Yet a further aspect of the present disclosure provides a system comprising a processor, and a computer readable medium storing one or more instruction(s) arranged such that when executed the processor is caused to perform the method described above.

BRIEF DESCRIPTION OF THE DRAWINGS

Embodiments of the invention will now be described with reference to the accompanying drawings, wherein like reference numerals refer to like parts, and wherein: —

DETAILED DESCRIPTION OF THE DRAWINGS

Figure 1:
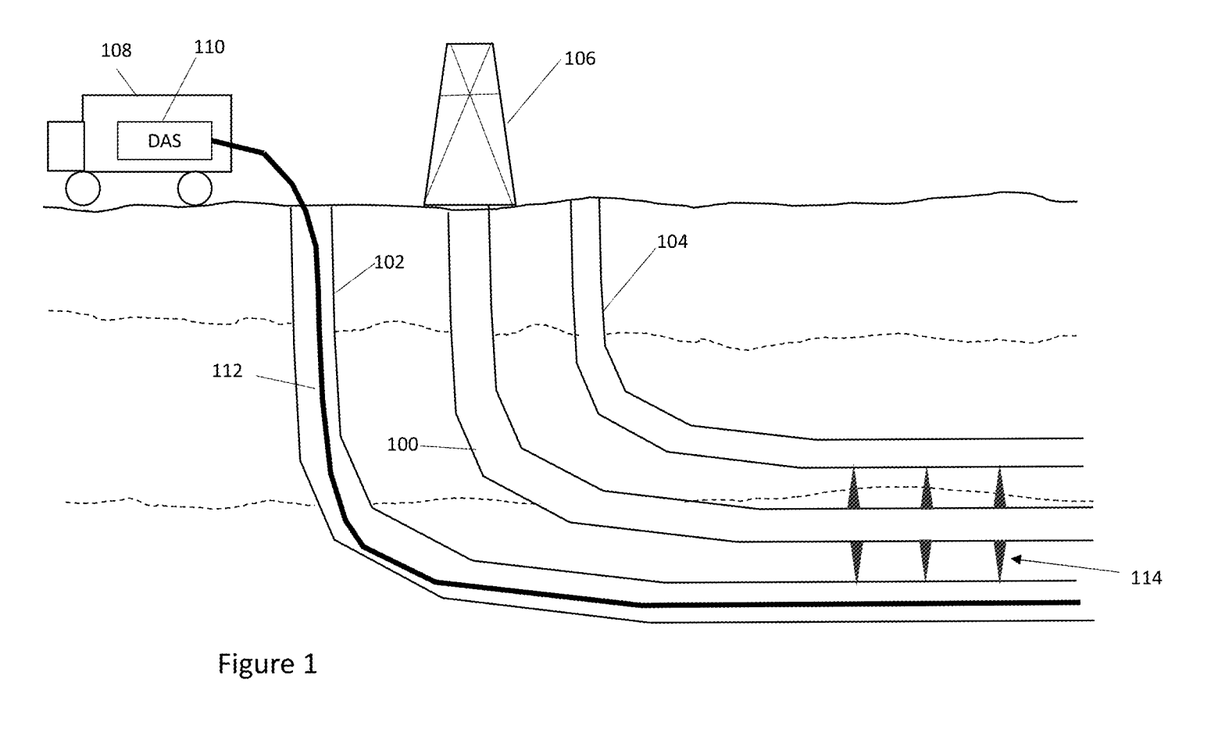
FIG. 1 is a diagram illustrating an example hydraulic fracking system comprising multiple wells and a DAS system.

FIG. 1 provides an example of a hydraulic fracking system in which embodiments of the present disclosure may be used, wherein multiple wells 100, 102 and 104 are available within a particular field. The first well 100 is connected to pumps 106 at the surface and is undergoing hydraulic fracking, with the offset wells 102 and 104 being inactive or used for other purposes such as monitoring. An optical fiber distributed acoustic sensor system, such as a Silixa® iDAS™ system 110 configured as described in WO2016/142695 is provided inside a wireline deployment truck 108. The wireline deployment truck 108 has conventional wireline deployment apparatus which is able to deploy a wireline 112, the wireline 112 comprising a high reflectivity optical fibre such as those described in our previous applications WO2016/142695 and US2020/0072995, or a conventional fiber (which may be single mode or multi-mode, and which need not have any increased reflection or backscatter characteristics) such as that described in our earlier application WO2010/136810, into one of the offset wells 102. As will be seen, the cable sits at the bottom of the well tubing or casing, in contact therewith (the small gap shown is for illustration purposes only so it is clear which is the cable and which the casing or tubing). The optical fiber DAS system then operates as described in WO2016/142695 to detect high spatial resolution (typically ~<1 m) and high bandwidth (typically up to ~100 kHz) acoustic information from along the length of the production zone. In particular, any of microseismic, low frequency strain (<1 Hz) and drilling induced vibrations can be detected inside the wellbore using the wireline cable 112 connected to the DAS 110.

Whilst the use of a wireline cable is described herein, it will be appreciated however that the optical fiber DAS system may be used in conjunction with a permanently installed cable in one or more of the wells, or some other temporary fiber optic cable.

As the treatment well 100 undergoes hydraulic stimulation, multiple fracture events 114 occur along the well 100. Specifically, the fracking pump is first started and fracking fluid is pumped into the well under hydraulic pressure, the hydraulic pressure in the well 100 rises, such that the surrounding rock strata absorbs the increased pressure. Once the hydraulic pressure is such that the rock strata begins to fracture, then multiple fracturing hits on the offset wells 102, 104, are seen as the rock fractures along the well 100 and acoustic energy is released with each fracture 114. When the fracking pump is stopped and the hydraulic pressure begins to subside, further acoustic energy is generated as the various fractures that were opened then close again, although as will be seen the acoustic energy of the fractures 114 closing is less than the acoustic energy generated by the initial fractures generated when the pump is on. As will be described in more detail below, the low frequency strain experienced in the wireline 112 due to the poroelastic effects in the rock as fluid is pumped into the well 100 can then be measured to identify the location and timing of the fracture hits experienced by the offset wells 102, 104. Being able to actually see the formation of individual fractures in this manner, allows completion engineers to measure or estimate the effectiveness of hydraulic fracturing operations more effectively.

Figure 2:
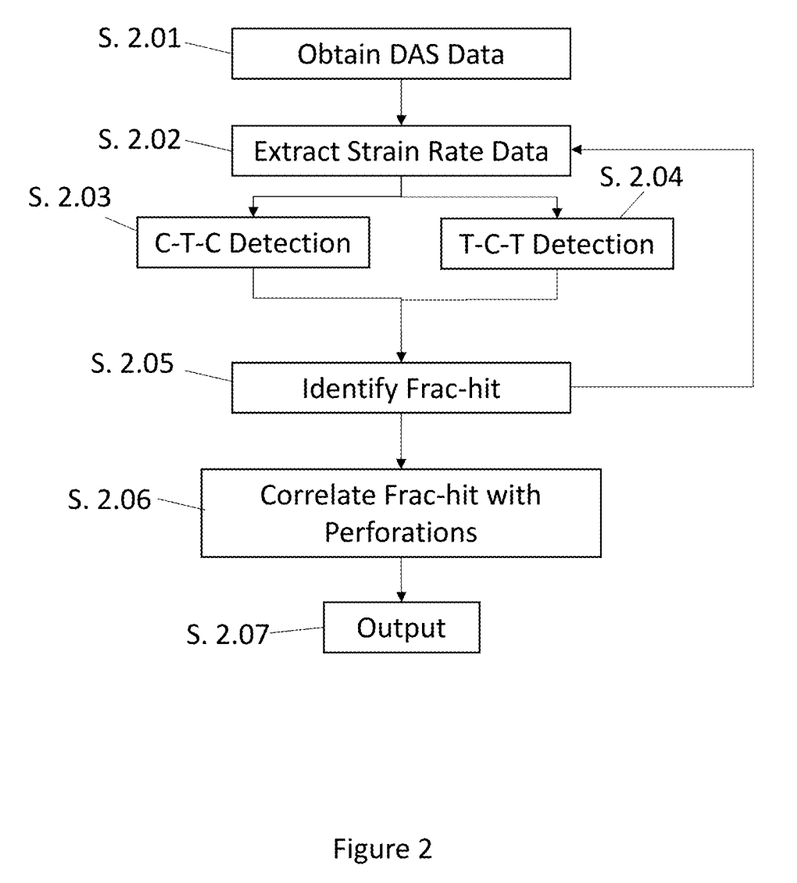
FIG. 2 is a flow diagram illustrating a method of monitoring fracture hits in accordance with embodiments of the present disclosure.

FIG. 2 illustrates a method of determining the location and timing of fractures and fracture hits according to the present disclosure. At a first step 2.01, DAS data is obtained, for example, via the set-up described above with reference to FIG. 1. In this respect, the DAS data may be obtained in real-time during a fracture operation, although it will be appreciated that the DAS data may also be received for processing after a fracking stage has been completed.

Next, at step 2.02, the strain rate data as a function of time, that is, the rate at which the strain on the fiber is changing with time, is extracted from the DAS data, using any suitable signal processing techniques to remove noise from the DAS signal.

The strain rate data is then processed to identify compression-tension-compression (C-T-C) features (s.2.03) corresponding to a fracture opening, and tension-compression-tension (T-C-T) features (s.2.04) corresponding to a fracture closing, the strain data being iteratively processed at each instant time to look for these C-T-C and T-C-T features. Each instant time may be any suitable time period, for example, the strain rate data may be processed every 1 second up to every 20 seconds to look for the C-T-C and T-C-T features. The Silixa® iDAS™, for example, is capable of processing strain rate data every 1 second by averaging 1000 millisecond of data, but in use, the strain data may be processed every 10 seconds (i.e. 10,000 millisecond of data). It will however be appreciated that any suitable time interval may be used depending on the setting in which the system is being used, and the frequency at which DAS data is received.

Figure 3:
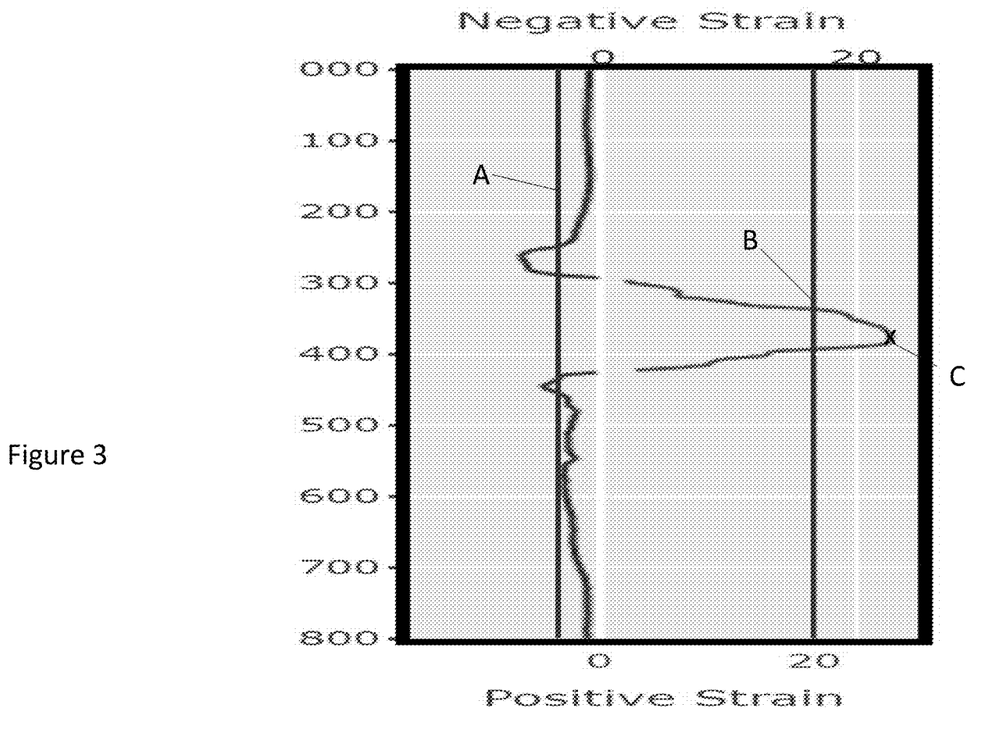
FIG. 3 is a diagram illustrating strain rate data for a fracture opening, as measured by a DAS system.

An example of a compression-tension-compression feature is shown in FIG. 3. FIG. 3 is a graph that shows the amplitude of the strain rate measured by a sensing region of a sensing fiber, the sensing region being defined by channels of the fiber that can then be directly correlated with a particular depth of the well based on the location of the sensing region along the fiber. As shown in FIG. 3, a compression-tension-compression feature is characterised by a region of negative amplitude below a first predetermined threshold A, followed by a region of positive amplitude above a second predetermined threshold B, followed a further region of negative amplitude below the first predetermined threshold A. This is indicative of a fracture opening and thus a fracture hit, with the position of the peak amplitude C in the positive region corresponding to the location of the fracture hit. As such, in this example, the fracture hit C is at channel 375, which can then be translated to a particular depth and location along the well.

The same approach can then be applied for identifying tension-compression-tension features, which are indicative of a fracture closing. However, in this case, the tension-compression-tension feature will be characterised by a region of positive amplitude above a third predetermined threshold, followed by a region of negative amplitude above the fourth predetermined threshold, followed by a further region of positive amplitude above the third predetermined threshold. It will of course be appreciated that the predetermined thresholds will be selected depending on the material of the surrounding rock strata, for example, a lower threshold for the positive amplitude may be set for a weaker fracture hit.

In another arrangement, the C-T-C and T-C-T features may be identified using a machine-learning system without the need to set negative and positive amplitude thresholds, with the machine learning system instead being trained to detect such features in the strain rate data.

Based on the detection of the compression-tension-compression and tension-compression-tension features, the fractures and fracture hits can be identified (s.2.05). In practice, the fracture opening and closing will be almost instantaneous, and so by processing the strain data to look for an opening C-T-C feature and a closing T-C-T feature at each instant time (i.e. every few second) that are at the same depth, a fracture hit can be identified in substantially real-time as the DAS data is received from along the fiber 112, with the location along the well and the duration of the fracture hit being determined to a relatively high degree of accuracy based on where the strain rate data is measured along the sensing fiber.

Figure 4:
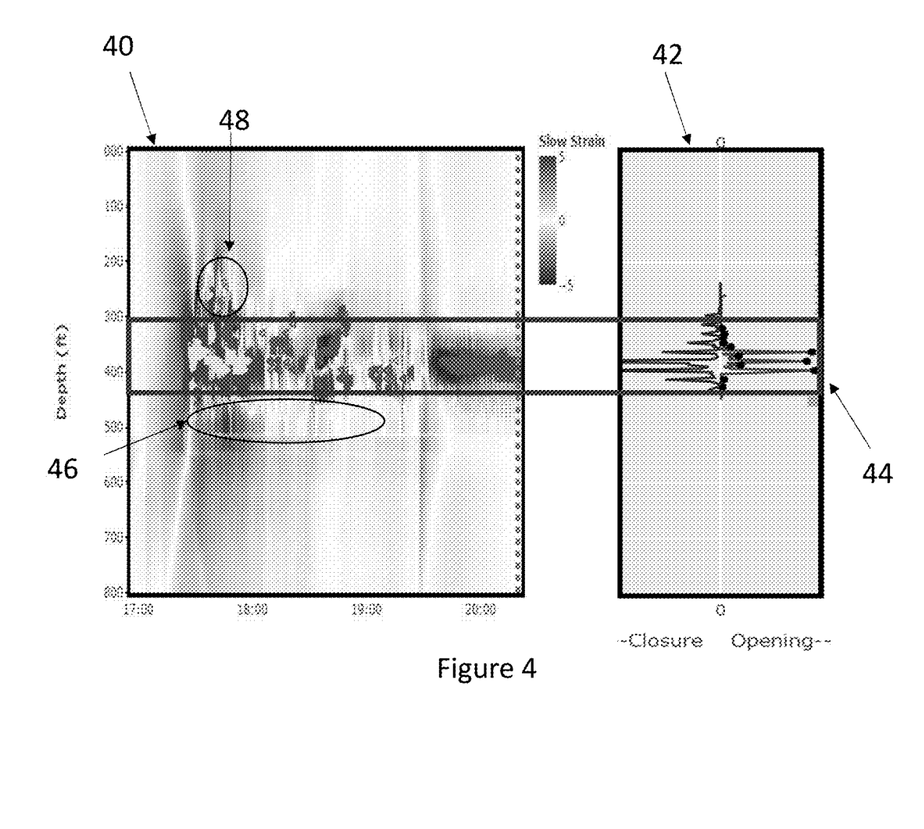
FIG. 4 is is plot of acoustic energy measured at different depths along a well versus time and a corresponding histogram.

The summation of the number of identified instantaneous fracture hits or the intensity of each fracture hit can then be used to provide a more consistent measurement of the location and duration of each fracture hit during a stage of fracking. In this respect, FIG. 4 illustrates a plot of acoustic energy 40 and a corresponding histogram 42 summing the number of identified C-T-C and T-C-T features. The plot 40 shows acoustic energy 40 from depth along the well (vertical axis) against time (horizontal axis), with higher intensity acoustic energy shown in red through to yellow colours, and then lower acoustic energy shown in green to blue colours (in decreasing energy levels). The histogram 42 then shows the summation of the number of C-T-C and T-C-T features identified at each depth, with portions in the negative direction shown in blue corresponding to facture closing events and portions in the positive direction shown in red corresponding to fracture opening events. A region 44, where the major fracture openings are strongly correlated with the major fracture closings, can thus be accurately identified as the location of a fracture hit.

In previous methods using manual inspection or summation to look for discrete peaks in the strain rate may result in false fracture openings being identified, such as those denoted 46 and 48. However, by looking for columns 44 where both a major opening and a major closing is seen, the actual fracture hit and its location is identified with a higher degree of accuracy and confidence. Moreover, by iteratively processing the strain rate data at each instant time to look for C-T-C features that are strongly correlated with T-C-T features, the location of fracture hits can be identified in substantially real-time during a fracking stage.

In use, the identified fracture hit locations can be correlated with one of the perforations in the treatment well 100 (s.2.06). In this respect, the number of perforations and the spacing between perforations along with well 100 will be known, and so the location of the fracture hit along the offset wells 102, 104 can be correlated with one of the perforations based on the known spatial configuration of the perforations. This information can then be output to an engineer (s.2.07), who may use this information, as an example, to determine the effectiveness of the hydraulic fracturing operation and adjust parameters of the operation accordingly.

Figure 5:
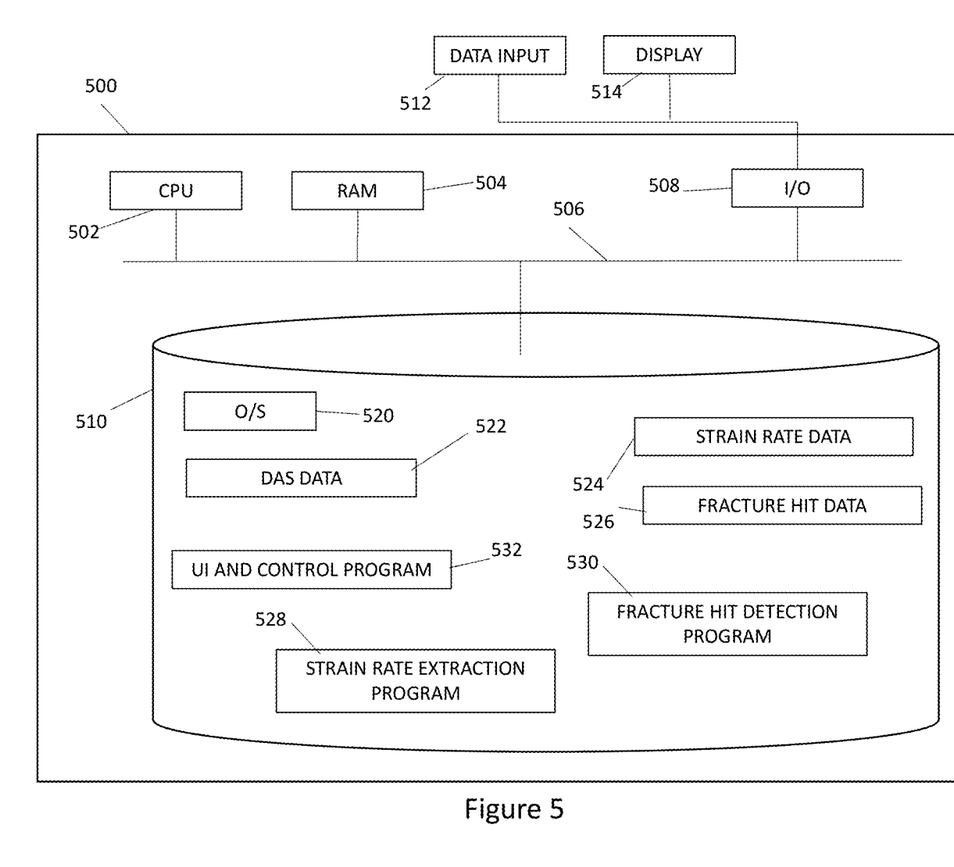
FIG. 5 is a block diagram illustrating a computer system on which the method of monitoring fracture hits may be implemented.

FIG. 5 illustrates an example of a general computing device 500 that may form the platform for embodiments of the present disclosure. For example, the computing device 500 may be a computer, a tablet, laptop or the like. The computing device 500 comprises a central processing unit (CPU) 502 and a working memory 504, connected by a common bus 506, and having an input-output (I/O) interface 508 arranged to receive control inputs via a device connected to a data input port 512 such as a keyboard, mouse, touchscreen, push button, or other controller, and provide output information via a user interface which is displayed on a visual display device 514.

The computing device 500 is also provided with a computer readable storage medium 510 such as a hard disk drive (HDD), flash drive, solid state drive, or any other form of general-purpose data storage, upon which stored DAS data 522, strain rate data 524 and fracture hit data 526 and various programs are arranged to control the computing device 500 to operate in accordance with embodiments of the present invention. For example, stored on the computer readable storage medium 510 is an operating system program 520 that when run by the CPU 502 allows the system to operate. Also provided is a strain rate extraction program 528, which extracts the strain rate data 524 from the DAS data 522 when run by the CPU 502, as well as a fracture hit detection program 530, which performs the fracture hit identification method described above based on the strain rate data 524. In order to interface with and control the strain rate extraction program 528 and fracture hit detection program 530, a user interface and control program 532 is also provided, that controls the computing device 500 to provide an output such as the fracture hit data 526 to the display 514, and to receive inputs such as the DAS data 522 via any input means connected to the data input port 512, or any other device that may be connected to the I/O interface 508 in order to control the strain rate extraction program 528 and the fracture hit detection program 530.

Whilst the programs and data shown in FIG. 5 are described as being stored and implemented by a single computing system, it will of course be appreciated that multiple computing devices may be used. For example, the DAS data, strain rate data and strain rate extraction program may be stored on one computing system in communication with a second computing system on which the fracture hit detection program is implemented.

Various modifications, whether by way of addition, deletion, or substitution may be made to above mentioned embodiments to provide further embodiments, any and all of which are intended to be encompassed by the appended claims.

For example, whilst the above description generally relates to the monitoring of fracture hits during a hydraulic fracking operation, it will be appreciated that the method described herein may be applied to any application where a fracture in a structure or rock formation has a poroelastic effect, including but not limited to, detecting failure in infrastructures such as a damn or dyke, carbon capture and utilisation systems and enhanced geothermal energy systems.

The invention claimed is:

1. A method of detecting acoustic energy generated by a poroelastic effect of fractures in an area or structure to be monitored, the method comprising:
receiving distributed acoustic sensor (DAS) data from an optical fiber distributed acoustic sensor having a sensing fiber deployed in a vicinity of the area or structure;
processing the DAS data to obtain a set of strain rate data;
iteratively processing the strain rate data to detect a set of first features and a set of second features, wherein detection of a first feature and a second feature at a same sensing region along the sensing fiber is indicative of a fracture hit at a first location, wherein the fracture hit is an interaction between a fracture and another structure in the vicinity of the area or structure to be monitored; and
outputting data indicative of one or more detected fracture hits for use in monitoring the area or structure.

2. A method according to claim 1, wherein the first feature comprises a compression-tension-compression feature in the strain rate data.

3. A method according to claim 2, wherein detecting a compression-tension-compression feature in the strain rate data comprises:
detecting a first portion of negative strain data below a first predetermined threshold at a first sensing position along the sensing fiber;

detecting a first portion of positive strain rate data above a second predetermined threshold at a second sensing position along the sensing fiber; and detecting a second portion of negative strain data below the first predetermined threshold at a third sensing position along the sensing fiber;

wherein the first predetermined threshold is lower than the second predetermined threshold, and wherein the second sensing position is between the first and third sensing position.

4. A method according to claim 1, wherein the second feature comprises a tension-compression-tension feature in the strain rate data.

5. A method according to claim 4, wherein detecting a tension-compression-tension feature in the strain rate data comprises:

detecting a first portion of positive strain data above a first predetermined threshold at a first sensing position along the sensing fiber;

detecting a first portion of negative strain rate data below a second predetermined threshold at a second sensing position along the sensing fiber; and detecting a second portion of positive strain data above the first predetermined threshold at a third sensing position along the sensing fiber;

wherein the first predetermined threshold is higher than the second predetermined threshold, and wherein the second sensing position is between the first and third sensing position.

6. A method according to claim 1, wherein the first feature is indicative of a fracture opening and the second feature is indicative of a fracture closing.

7. A method according to claim 1, wherein the first location is determined based on a position of the sensing region along the sensing fiber.

8. A method according to claim 1, wherein the method comprises detecting a plurality fracture hits are detected at the first location during a first period of time.

9. A method according to claim 8, further comprising:

computing a first sum of a number or intensity of the first feature detected during the first period of time; and computing a second sum of a number or intensity of the second feature detected during the first period of time.

10. A method according to claim 1, wherein the sensing fiber is deployed along a first well in the vicinity of a second well undergoing hydraulic fracturing operations.

11. A method according to claim 10, wherein the first feature is indicative of a rock fracture opening around or in the second well during a first hydraulic fracturing operation.

12. A method according to claim 11, wherein the second feature is indicative of a rock fracture closing around or in the second well after the first hydraulic fracturing operation has ceased.

13. A method according to claim 10, wherein the detection of a first feature and a second feature at a same sensing region along the sensing fiber is indicative of a fracture hit in the first well from the second well.

14. A method according to claim 10, wherein the method further comprises correlating the fracture hit at the first location with at least one perforation along the second well.

15. A method according to claim 1, wherein the strain rate data is iteratively processed in substantially real-time.

16. A method according to claim 1, wherein the strain rate data is processed in intervals of about 1 second up to about 20 seconds.

17. A system for detecting acoustic energy generated by a poroelastic effect of fractures in an area or structure to be monitored, the system comprising:

an optical fiber distributed acoustic sensor having a sensing fiber deployed in a vicinity of the area or structure; and processing means operatively configured to:

(i) process distributed acoustic sensor (DAS) data received from the optical fiber distributed acoustic sensor to obtain a set of strain rate data;

(ii) iteratively process the strain rate data to detect a set of first features and a set of second features, wherein detection of a first feature and a second feature at a same sensing region along the sensing fiber is indicative of a fracture hit at a first location, wherein the fracture hit is an interaction between a fracture and another structure in the vicinity of the area or structure to be monitored; and (iii) output data indicative of one or more detected fracture hits for use in monitoring the area or structure.

18. A system according to claim 17, wherein the sensing fiber is deployed along a first well in the vicinity of a second well undergoing hydraulic fracturing operations.

19. A system according to claim 17, wherein the sensing fiber is one of: a wireline, a permanently installed optical fiber cable or a temporarily installed optical fiber cable.

20. A system comprising:

a processor; and a computer readable medium storing one or more instruction(s) arranged such that when executed the processor is caused to:

receive distributed acoustic sensor (DAS) data from an optical fiber distributed acoustic sensor having a sensing fiber deployed in a vicinity of an area or structure to be monitored;

process the DAS data to obtain a set of strain rate data;

iteratively process the strain rate data to detect a set of first features and a set of second features, wherein detection of a first feature and a second feature at a same sensing region along the sensing fiber is indicative of a fracture hit at a first location, wherein the fracture hit is an interaction between a fracture and another structure in the vicinity of the area or structure to be monitored; and output data indicative of one or more fracture hits for use in monitoring the area or structure.

* * * * *